(12) United States Patent
Norri

(10) Patent No.: US 6,732,453 B2
(45) Date of Patent: May 11, 2004

(54) METHOD AND APPARATUS FOR ARRANGING EXHAUST AIR AND SUPPLY AIR IN A DRYING SECTION

(75) Inventor: Petri Norri, Turku (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 10/204,384

(22) PCT Filed: Feb. 16, 2001

(86) PCT No.: PCT/FI01/00149

§ 371 (c)(1), (2), (4) Date: Aug. 20, 2002

(87) PCT Pub. No.: WO01/63044

PCT Pub. Date: Aug. 30, 2001

(65) Prior Publication Data

US 2003/0009905 A1 Jan. 16, 2003

(30) Foreign Application Priority Data

Feb. 21, 2000 (FI) .............................................. 20000387

(51) Int. Cl.[7] .................................................. F26B 3/00
(52) U.S. Cl. .............................. 34/444; 34/454; 34/119; 34/124; 34/514
(58) Field of Search .......................... 34/444, 421, 422, 34/448, 449, 451, 454, 513, 514, 119, 117, 124, 209

(56) References Cited

U.S. PATENT DOCUMENTS 5,033,207 A   7/1991   Sturm et al.

5,845,415 A * 12/1998   Sundqvist .................... 34/452

FOREIGN PATENT DOCUMENTS

| DE | 43 04 244 A1 | 8/1993 |
| FI |      903452  | 1/1991 |
| FI |      990080  | 7/2000 |
| WO | WO 01/63044 A1 | 8/2001 |

OTHER PUBLICATIONS

International Search Report issued in PCT/FI01/00149.
International Preliminary Examination Report issued in PCT/FI01/00149.

* cited by examiner

*Primary Examiner*—Henry Bennett
*Assistant Examiner*—Camtu Nguyen
(74) *Attorney, Agent, or Firm*—Stiennon & Stiennon

(57) ABSTRACT

A method and an apparatus for arranging exhaust air and supply air in a drying section covered with a hood (14) in a paper machine, having drying cylinders (10) or the like and devices operating by negative and positive pressure. The exhaust air from the devices operating by negative pressure, such as suction rolls (20) and suction boxes is supplied out from the drying section via a first heat recovery tower (22). Substitute air is supplied via this first heat recovery tower to the runnability components (38) operating by positive pressure in the drying section. Substitute air can be additionally supplied via a second separate heat recovery tower (22') to devices (40, 42) supplying heating air and/or ventilation air. The main portion of the exhaust air from the air space of the hood is supplied via this second heat recovery tower and out from the drying section.

16 Claims, 5 Drawing Sheets

METHOD AND APPARATUS FOR ARRANGING EXHAUST AIR AND SUPPLY AIR IN A DRYING SECTION

BACKGROUND OF THE INVENTION

The present invention relates to a method and apparatus for arranging the exhaust air and supply air in a drying section of a paper machine or in a corresponding drying section covered by a hood, the drying section having at least one drying group provided with drying cylinders and devices operating by negative or positive pressures.

The drying section of a paper machine or the like utilises devices operating by negative pressure, such as suction rolls, e.g. VacRoll rolls by Metso Paper, Inc., suction boxes and other rolls provided with suction devices, with which a negative pressure is generated at a desired point on a web section between the drying rolls in order to control and stabilise the run of the web. Devices operating by negative pressure means in the following at least all devices in the drying section of the above mentioned type, if nothing else is particularly stated.

On the other hand, the drying section in a paper machine or the like utilises also devices operating by positive pressure, such as blow boxes, for instance UnoRun or SymRunHS boxes by Metso Paper, Inc., which create a negative pressure at a desired point of the web section, the negative pressure attaching the web to the wire and stabilising its run. These devices are called runnability components. Further the drying section utilises other devices operating by a positive pressure, such as blowing hoods, which can direct air blows intensifying the drying directly on the web, or through the wire on the web. Further the drying section uses heating devices and/or devices supplying ventilation air in order to exhaust humid air i.e. from the pockets left between the drying cylinders and the web or the wire, and thus to create advantageous drying conditions. Devices operating by positive pressure means in the following, if nothing else is particularly stated, at least all devices of the above mentioned type in the drying section.

The moisture content which is transferred from the paper web to the air is removed from the drying sections covered by a hood, by removing humid air from the hood space and by substituting the exhaust air by a corresponding volume of drier, so called substitute air. Then the humid exhaust air from the drying section is mainly directly from the air space of the hood, typically via the ceiling of the hood.

On the other hand, devices operating by negative pressure, which remove air from negative pressure locations in order to create a negative pressure, can also be used to exhaust air from the hood. The air removed by the negative pressure devices is typically removed from the drying section together with the air removed through the ceiling of the hood.

Previously it is also known to circulate a part of the air removed from the locations of negative pressure, such as from a suction roll, back to the hood, for instance as blowing air to the blow boxes operating by positive pressure. Then a portion of the humid exhaust air flow from a number of suction rolls is directed to a mixing chamber or the like. In addition to the humid exhaust air from the suction rolls, the mixing chamber receives additional air which can be the above mentioned exhaust air from the air space of the hood, or circulating air, and/or heated substitute air. From the mixing chamber this mixture of circulating air and substitute air is directed to the blow boxes or other devices operating by positive pressure, first to the suction side of their blower and from there further to the device in question.

The air flows exhausted at different places of the hood are generally directed to a common exhaust channel which directs the exhaust air via a heat recovery tower and out from the plant. Generally the drying section is connected to several heat recovery towers, typically two or three towers.

The humid exhaust air from the hood is replaced by substitute air which is typically 50 to 80% drier and which is directed via heat recovery towers to the drying section, i.e. into the devices in the drying section which operate by positive pressure, such as blow boxes or devices which supply heating air or ventilation air. In addition, drier air leaks into the hood i.e. from the machine room.

Thus present drying sections require a large number of air exhausts and blowers for each heat recovery tower in the air system of the hood in order to exhaust humid air from the hood space, to create a negative pressure in the required places, to bring substitute air and to circulate circulating air. Each blower, as well as the numerous channels connected to them, occupy a relatively large space.

The large number of blowers, as well as the large amount of channels connected to them, increases the price of the plant, increases the energy costs and requires much space. The large number of blowers further makes the system complicated and makes it more difficult to control the drying and the air and energy balance.

SUMMARY OF THE INVENTION

The object of the present invention is to provide an improvement to the above mentioned disadvantages and to provide an improved method and apparatus for arranging the exhaust air and supply air in a drying section.

Then the object is to provide a method and an apparatus with which the humid air exhaust and the substitute air supply can be realised by fewer blowers than previously.

An object is also to provide in the drying section an apparatus which can be controlled more easily than previously for exhausting humid air and for supplying substitute air and for supplying and exhausting air from the runnability components and suction rolls.

A further object is to provide a method and an apparatus which reduce the circulation of humid air in the hood, as compared to the previously existing circulation.

An object is also to provide a method and an apparatus which reduce one-sided drying, as compared to the previously existing drying.

The apparatus according to the invention is typically suited to be used for arranging exhaust air and supply air in a drying section covered by a hood in a paper machine or the like having a drying group provided with drying cylinders or the like. However, the invention is also suited to be used in such drying sections where the drying group comprises, in addition to or instead of the drying cylinders, other corresponding drying devices known as such, such as suction rolls or the like provided with top blowing hoods. Further, the drying section comprises different devices operating by negative or positive pressure, such as suction rolls, suction boxes, runnability components operating by positive pressure and/or devices which supply heating air and/or ventilation air. Further at least two heat recovery towers are connected to the drying group.

It is typical to a solution according to the invention that it utilises at least two heat recovery towers, through which different air flows are directed, in other words air from different locations and/or intended for different locations.

In a typical solution according to the invention, a heat recovery tower of the first type is dimensioned for a mainly constant volume of exhaust air from devices operating by negative pressure and to supply a mainly constant volume of air to devices operating by positive pressure. The exhaust air and supply air volumes are generally constant, but they can be adjusted when required. Generally 1 to 5 heat recovery towers of this first type, typically 1 to 2 of them, are connected to the drying section. However, there may be a larger number of towers.

In a typical solution according to the invention, the air volumes fed through a heat recovery tower of the second type are typically adjustable. The adjustment of these air volumes controls the volume of humid exhaust air from the hood and the volume of substitute air supply to the hood. Typically there is only one heat recovery tower of this second type, but naturally there may be more when required. The number of the heat recovery towers of the first type is typically equal to or higher than the number, e.g. one, of the last mentioned towers with adjustable air supplies.

The heat recovery towers are typically provided with heat exchangers which can preheat the substitute air supplied to the drying section and/or heat the water used in the processes of the plant. A heat recovery tower means in this invention all such structures with which the heat of the exhaust air flows from the drying section can be recovered for heating different water flows and/or air flows.

A typical apparatus according to the invention comprises, in that part of the drying section where one heat recovery tower of the first type and at least one heat recovery tower of the second type are combined: a first blower for exhausting air from devices operating by negative pressure, via a first heat recovery tower and out from the drying section; a second blower for directing a first substitute air flow via the first heat recovery tower to devices operating by positive pressure, which typically are runnability components, such as blow boxes stabilising the run of the web; a third blower for directing a second substitute air flow via the second heat recovery tower to other different devices operating by positive pressure, which typically are devices supplying heating and ventilation air; and a fourth blower for exhausting air from the hood, typically from the ceiling of the hood, and for directing it via the second heat recovery tower and out from the drying section.

In the solution according to the invention a part of the exhaust air from the hood can be circulated, as mixed with substitute air, by the second blower back to the hood, to some devices operating by positive pressure.

As previously mentioned, a number of heat recovery towers representing the first and second types can be connected to the drying section. Then also corresponding additional blowers are arranged in the drying section, in other words blowers for each heat recovery tower in accordance with the above presentation.

In this invention a blower means all conventional blowers or corresponding devices, which are suitable for transporting the air flows in the drying section.

BRIEF DESCRIPTION OF THE DRAWINGS

Below the invention is described in more detail with reference to the enclosed drawings, in which.

DESCRIPTION OF THE PREFERRED EMBODIMENTS

Figure 1:
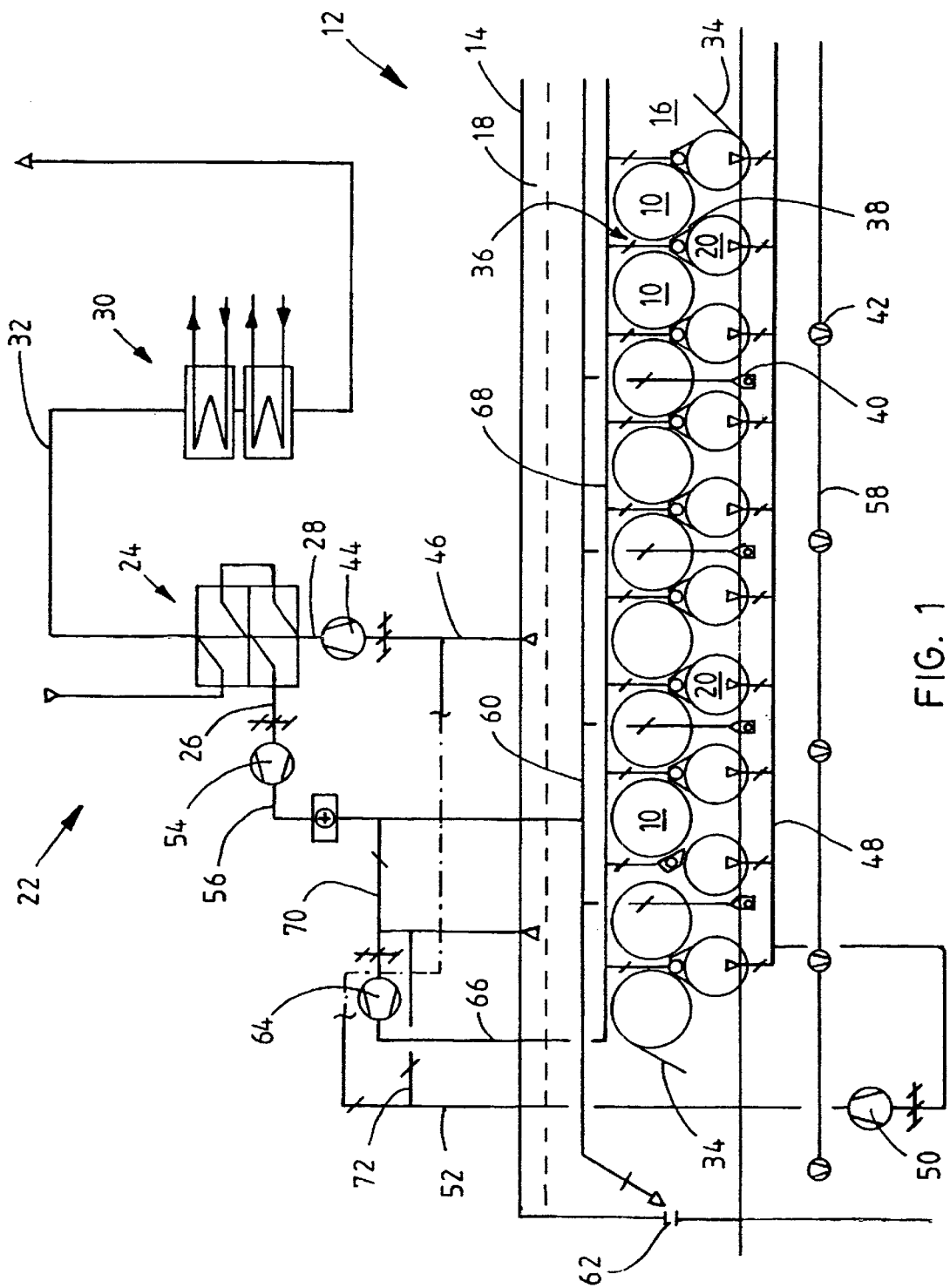
FIG. 1 shows schematically a previously known arrangement of exhaust air and supply air in a drying section provided with drying cylinders, at a heat recovery tower.

FIG. 1 shows a previously known arrangement of exhaust air and supply air in a part of the drying section 12 provided with drying cylinders 10. The drying section is covered by a hood 14, which has a ceiling 18 partially isolated from the air space 16 of the hood.

The drying section has one row of drying cylinders 10, and below them another row of suction rolls 20 operating by a negative pressure, whereby these rolls are arranged between the drying cylinders and below them. The web to be dried travels forward, alternately over the periphery of the drying cylinders and the periphery of the suction rolls.

A heat recovery tower 22 having heat exchangers 24 is arranged over the drying section in order to preheat the substitute air flow 26 supplied to the drying section with the aid of the exhaust air flow 28 from the drying section 12. The heat recovery 22 tower further comprises heat exchangers 30 for heating the white water and the fresh water with the aid of the exhaust air flow 32 from the heat exchanger 24.

The web to be dried 34 forms a pocket 36 between each two adjacent drying cylinders 10 and the suction roll 20 below them. In these pockets there are arranged, above the web in the case shown in FIG. 1, blow boxes 38 operating by positive pressure, so called runnability components which create negative pressure regions which can stabilise the run of the web. The drying section may comprise a so called inverted drying cylinder group (not shown), where the suction rolls are arranged above the drying cylinders. In this case the blow boxes must be arranged below the web.

In the case of FIG. 1 there are further arranged below the web blowing members 40, having blows which are directed against the lower side of the web in order to ventilate the lower side of the web. Below the row of suction roll there are further arranged devices 42 which supply heating and ventilation air required by the drying section.

Air is removed from the drying section through the ceiling 18, which acts as a collecting space for the exhaust air, with the aid of a blower 44 through the exhaust channel 46 to the heat exchanger 24. Humid air is further directed from the suction rolls 20 in the drying section with the aid of a blower 50 via the channels 48 and 52 to the exhaust channel 46, where both exhaust air flows are combined, before the blower 44 and the heat exchanger 24.

The substitute air is supplied to the drying section via the heat exchanger 24 by the blower 54 to the inlet channel 56. The substitute air is directed with the inlet channel partly direct to the manifold channel 58, from which heating and ventilation air is blown with the aid of the members 42 under the suction rolls 20. In addition, substitute air is directed to another manifold channel 60, from which the air is directed to blow members 40 located between the suction rolls. From the manifold channel 60 air is also supplied to the paper inlet opening or outlet opening 62, in order to prevent the cool machine room air from entering into the hood and in order to prevent the humid air from escaping into the machine room.

The previously known apparatus shown in FIG. 1, in order to arrange the exhaust air and supply air, further comprises one blower 64 which is arranged to circulate air from the ceiling 18 to the blow boxes 38 located in the pockets 36. The circulating air is directed with the aid of the blower 64 in the channel 66 to the manifold channel 68 from which the air is distributed to the different blow boxes 38.

A small volume of substitute air from the channel 70, less than 20% of the total volume of substitute air, is added from the inlet channel 56 to the circulating air supplied to the blow boxes 38. In addition, humid air from the suction rolls 20 is added to the circulating air through the channel 72. Thus the circulating air entering to the blow boxes 38 is relatively humid, and thus it will not as such further the drying of the web.

Thus, in order to operate the previously known system requires for each heat recovery tower at least four different blowers 44, 50, 54, 64 with their channels. This makes the system bulky and thus increases its cost. In addition it must be possible to independently control each blower, whereby there must also be many control points, which makes it more difficult to master the system. The separate partial exhausts also increase the energy consumption and complicates the control.

Figure 2:
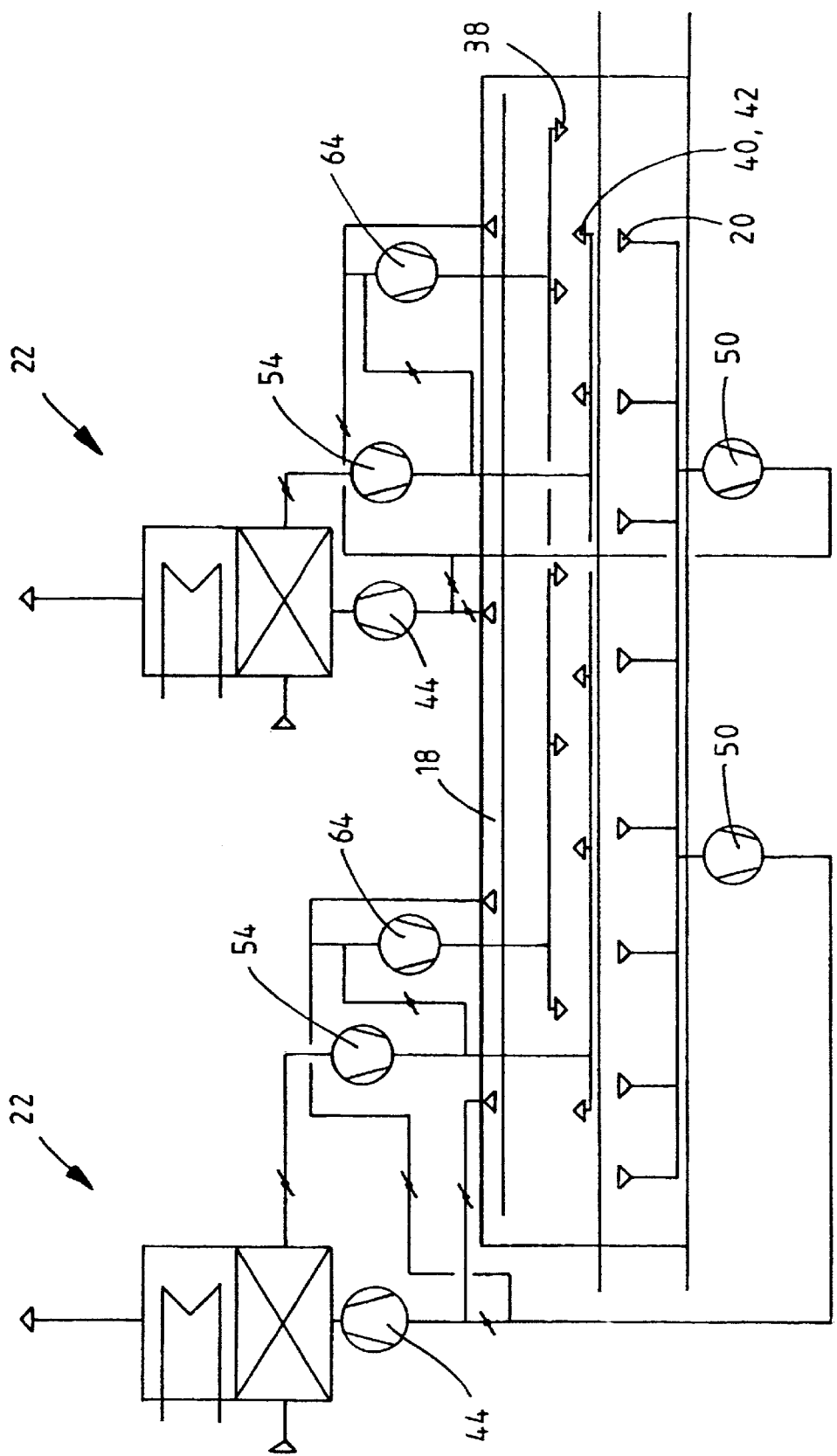
FIG. 2 shows in a simplified manner a previously known arrangement of exhaust air and supply air in a drying section, at two heat recovery towers.

FIG. 2 shows schematically a previously known apparatus arranging exhaust air and supply air in a drying section, this arrangement comprising two heat recovery towers. FIG. 2 uses the same reference numerals as FIG. 1. The application shown in FIG. 2 uses two identical heat recovery towers 22, which both are connected to similar devices for exhaust air and supply air flows.

In the application shown in FIG. 2 the exhaust air is supplied by the blowers 44 and 50 both from the ceiling 18 and from the suction rolls 20 to each heat recovery tower 22. Correspondingly, substitute air is supplied via both heat recovery towers 22 with the aid of the blowers 54, and regarding a minor portion, also with the aid of the blower 64 mixed to the circulating air, to the devices operating by positive pressure, such as the devices 40, 42 blowing heating air and ventilation air, and to the runnability components, such as the blow boxes 38 arranged in the pockets formed between the drying cylinders (not shown). This system requires at least eight blowers, or four blowers for each heat recovery tower.

Figure 3:
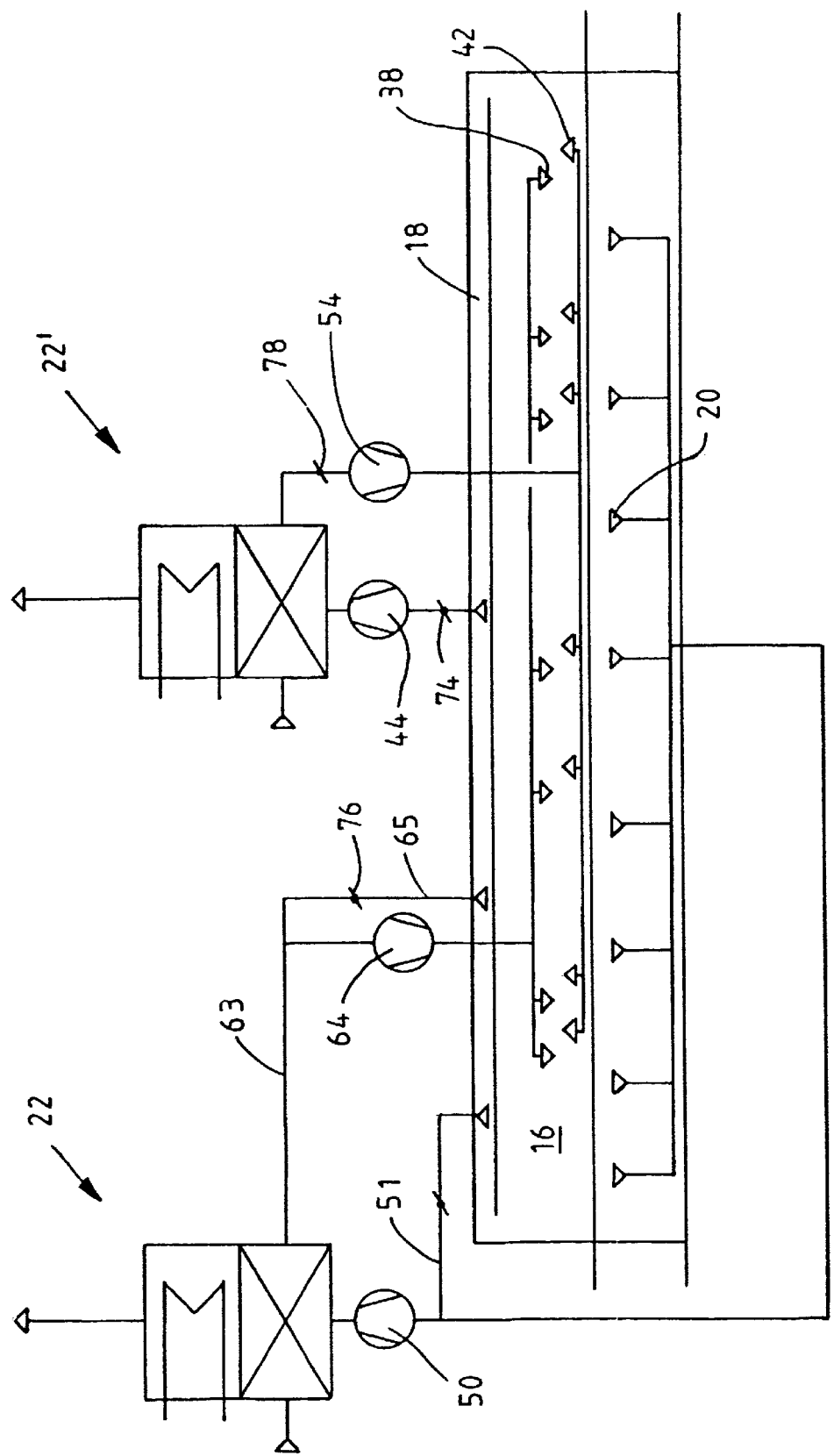
FIG. 3 shows in a similar manner as to FIG. 2 a part of an exemplary arrangement of exhaust air and supply air according to the invention, for two heat recovery towers.

FIG. 3 shows schematically, in a similar way as FIG. 2, an apparatus according to the invention for supplying air to a drying section and for exhausting air from the drying section. FIG. 3 uses, where applicable, the same reference numerals as FIGS. 1 and 2.

In the solution according to the invention shown in FIG. 3 the exhaust air from the suction rolls 20 and from the ceiling 18 is arranged to be mainly effected via two heat recovery towers 22 and 22' having different air removal locations. The heat recovery towers are dimensioned according to the respective application.

The humid exhaust air from the suction rolls is supplied by the blower 50 to the first heat recovery tower 22. Generally the exhaust air from the suction rolls is more humid than the air removed via the ceiling, because the suction openings of the suction rolls remove air from the vicinity of the surface of the web, in other words from a location with a maximum air humidity. With the aid of humid air removal it is possible to increase the power of the heat recovery tower compared to previously known solutions where the main part of the air supplied to the heat recovery towers originates from the hood, from the ceiling of the hood, which air is drier than the air now supplied to the tower.

The tower 22 is dimensioned according to the exhausts from the suction rolls. Normally it is not necessary to adjust the blower 50 during normal running conditions. However, also in the solution according to the invention, in special situations the tower 22 can receive exhaust air from the ceiling 18 of the hood via the channel 51, for instance in situations where the air volume from the suction rolls is too large.

Normally the air is removed from the air space of the hood via the ceiling 18 to the second heat recovery tower 22' with the aid of the blower 44. In this way about 20 to 60%, or even more, typically about 40%, of the air to be removed from the air space of the hood is exhausted through this one tower 22'. The exhaust is controlled according to the drying requirements, with the aid of either a separate guide vane controller or a damper 74, as shown in FIG. 3. The control can also be effected by frequency converter control of the motor of the blower 44.

From the ceiling, or directly from the air space of the hood, the blower 64 takes, via the channel 65, further circulating air to the runnability components 38. In the solution according to FIG. 3 the channel 63 in addition directs a large volume of substitute air, which is preheated in the heat recovery tower 22, into the circulating air. When required, the substitute air can be preheated in a separate steam or water radiator (not shown). The mixture of circulating air and substitute air is directed by the blower 64 to the runnability components 38. The amount of circulating air taken from the ceiling can be controlled by the damper 76. By controlling the ratio of circulating air and substitute air the damper 76 can affect the air balance of the hood and control the zero level. The volume of the substitute air coming from the first heat recovery tower is advantageously kept constant.

However, an adjustable volume of substitute air is brought through the second heat recovery tower 22' with the aid of the blower 54 to the heating and ventilation members 42. The air volume can be controlled for instance with a damper 78 arranged in front of the blower, with a guide vane controller or with a frequency converter control of the blower motor.

The tower 22 shown in FIG. 3 is planned and dimensioned to supply mainly predetermined air flows with the aid of the blowers 50 and 64. The air flows passing through the second tower are normally controllable according to the running situation, in other words they are air flows which create an optimal operation.

Therefore the solution according to FIG. 3 can substantially decrease the number of different exhausts, channels and blowers, compared to corresponding previously known solutions. In the solution according to FIG. 3 the need for blowers is halved compared to the solution of FIG. 2. Thus in the drying section of FIG. 3 the air channelling has a clearer structure than in previous solutions, and the control is simpler and easier to automate. In the compact solution according to FIG. 3 the air system is cheaper to construct. The solution leads to a compact apparatus, whereby it is often possible to save also in the plant building costs. Further the solution of FIG. 3 offers possibilities to reduce the power requirements and energy costs.

In the solution according to FIG. 3 the air is exhausted via the tower 22 generally in a more humid state than in the solution of FIG. 2, where mainly less humid air is exhausted from the hood via the tower. Thus the solution of FIG. 3 can generally increase the effect of the heat recovery tower, as compared to the solution of FIG. 2.

The removal of humid air directly from the suction rolls avoids unnecessary circulating of humid air within the hood, and a large portion of the moisture content can be removed from the web with a relatively small air volume and low apparatus costs. Because in the solution according to the invention the moisture will not anymore be transferred from the suction rolls into the air space of the hood, this provides also such an advantage that the walls of the hood will meet drier air than before, which lowers the risk of condensate creation and disadvantages caused by it.

Figure 4:
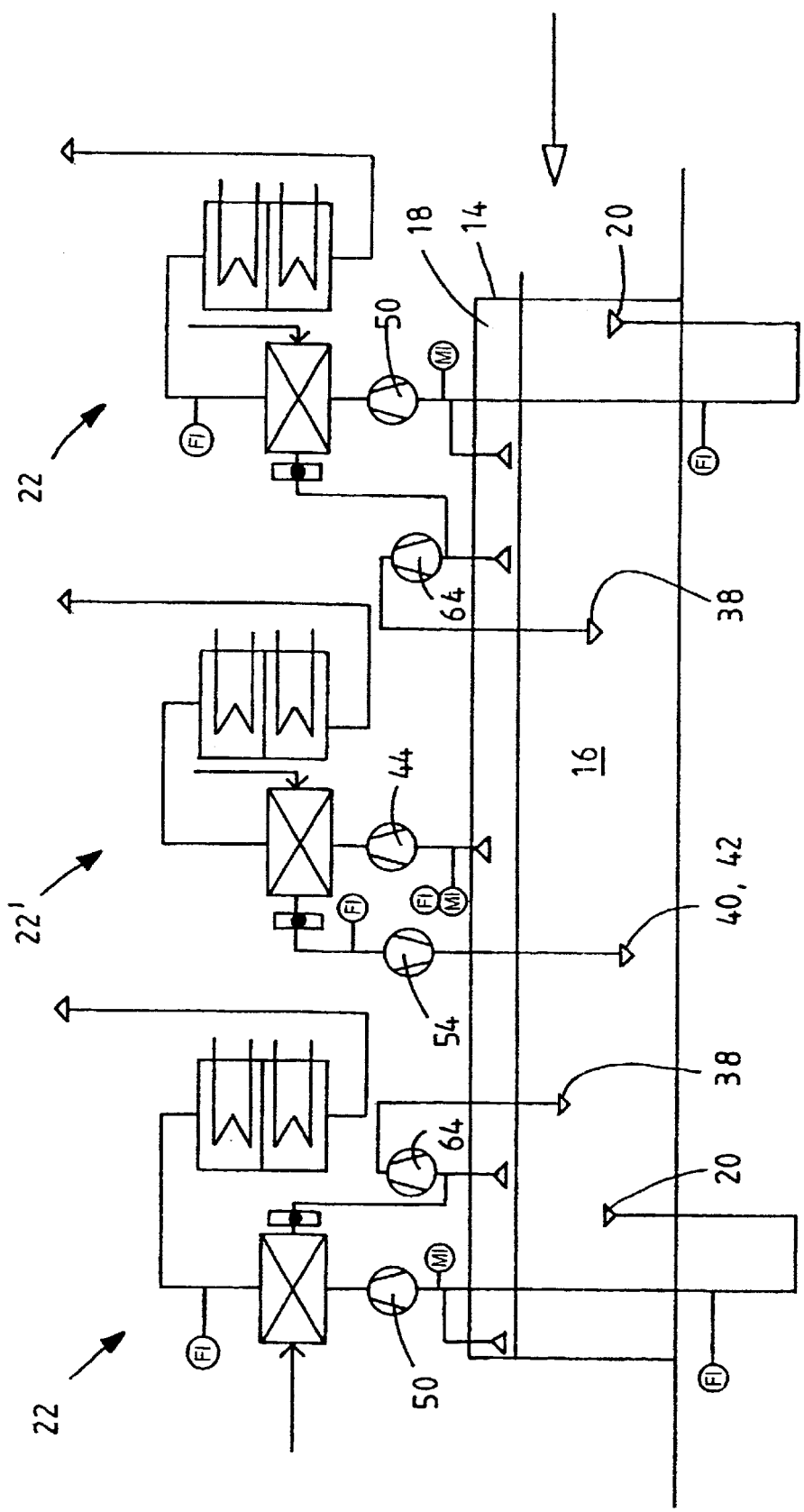
FIG. 4 shows schematically another solution according to the invention for arranging the exhaust air and supply air, for three heat recovery towers.

FIG. 4 shows another solution according to the invention. The same reference numerals as in the previous Figures are used also in FIG. 4, when applicable. In the drying section shown in FIG. 4 there are connected two heat recovery towers 22 according to the invention, through which the humid air of the suction rolls 20 is exhausted from the drying section and through which substitute air is supplied, mixed with the circulating air, to the runnability components 38. Air is further removed from the ceiling 18 of the hood via the second heat recovery tower 22'. The second tower 22' is used to preheat the substitute air to the heating and ventilation members 40, 42.

In the case of FIG. 4 the blowers 64 supply via the towers 22 typically 50 to 80% of the substitute air of the drying section. This substitute air is typically supplied to the runnability components 38, whereby this substitute air can cover about 20 to 100%, typically about 50% of the air required by the runnability components. A smaller portion of the substitute air of the drying section, or typically 20 to 50%, is brought via the tower 22'. This substitute air is mainly supplied to the heating and ventilation members 40, 42. In the case of FIG. 4 all air flows can be separately controllable.

Figure 5:
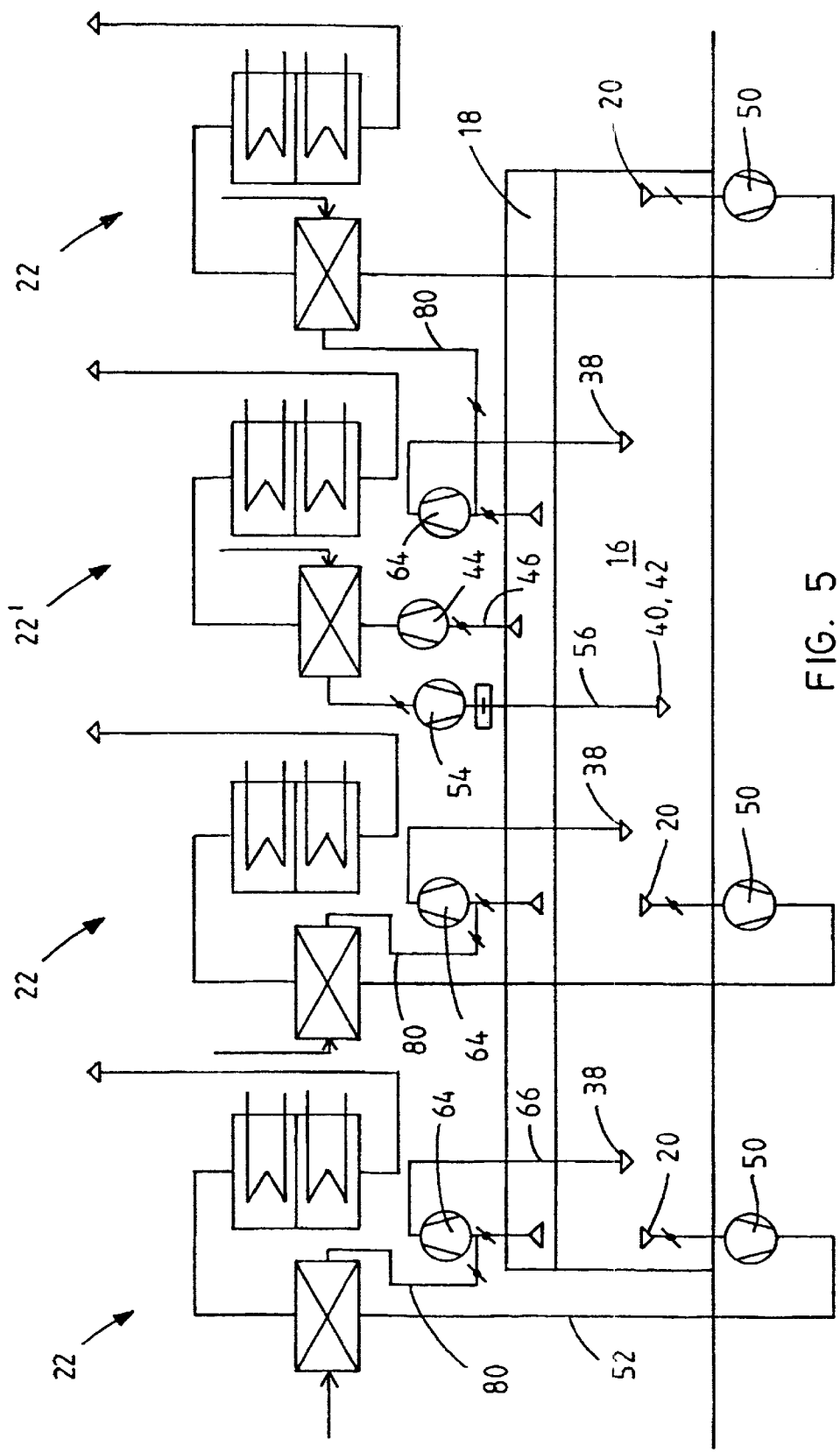
FIG. 5 shows schematically a third solution according to the invention for arranging the exhaust air and supply air, for four heat recovery towers.
Figure 1:
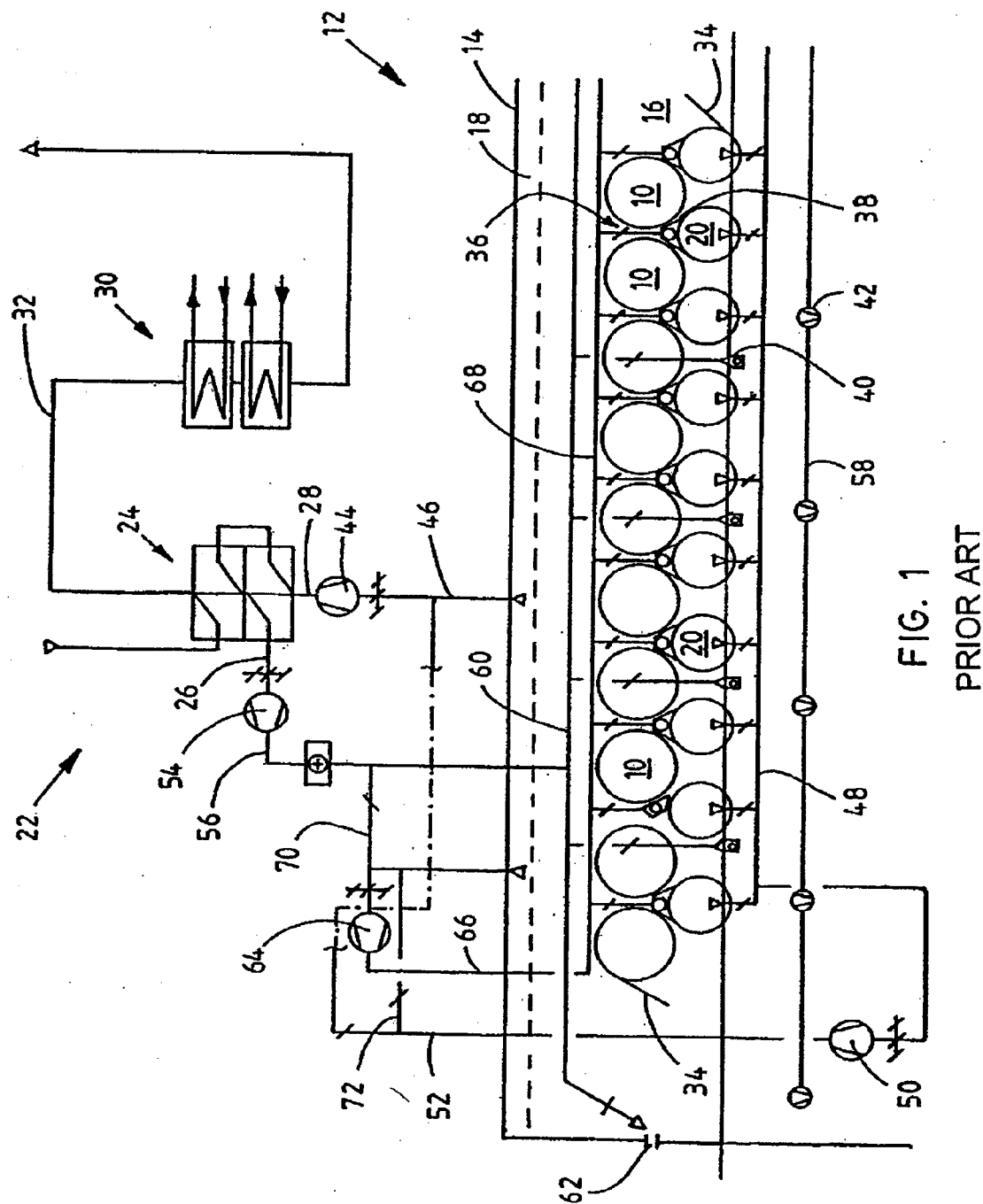
Figure 2:
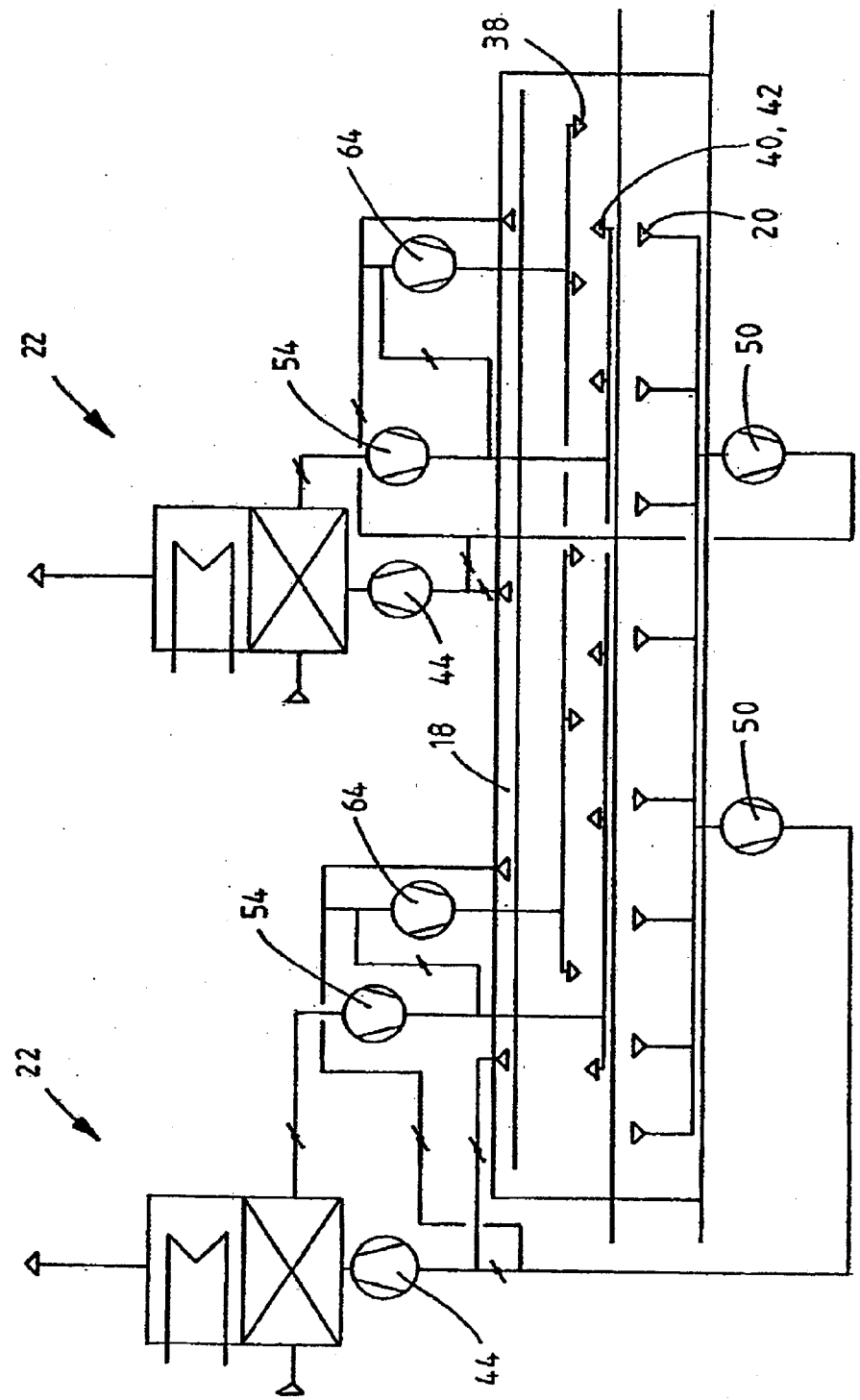

FIG. 5 shows still a third application of the invention. The same reference numerals as in the previous Figures are used in FIG. 5.

In the solution of FIG. 5 there are three heat recovery towers 22 according to FIG. 3, and only one heat recovery tower 22'. The exhaust air flows of the towers 22, as well as the substitute air flows 80, are mainly constant. Drying and air balance can be controlled by controlling the air flows of the tower 22'.

In the above case presented as an example, the blower 64 supplies to the runnability components 38 the substitute air and in addition circulating air from the ceiling 18 of the hood. However, due to the large volume of substitute air, the mixture of the substitute air and circulating air coming to the runnability components is drier than in the solutions of FIGS. 1 and 2 presented above, where the runnability components received an essentially smaller volume of substitute air, typically <20% substitute air. In the solution according to the invention the relatively dry air coming to the runnability components has an advantageous effect on the drying of the upper side of the web, and thus it reduces the tendency of the web drying section to dry the web more on the lower side, i.e. on the side facing the drying cylinder.

The inventive solutions according to FIGS. 3 to 5 are much simpler and have clearer structure than previous solutions, and thus they are easier to control. A smaller number of blowers, exhausts and other channels is required, which makes the solutions lighter, requiring less space, and cheaper. On the whole, the moisture content can be exhausted from the hood by smaller air volumes than previously in corresponding drying sections. In the solutions the heat recovery effect can be increased by supplying to the towers 22 exhaust air with a higher moisture content. At the same time, the disadvantages caused by the moisture to the structures of the hood are removed or minimised.

Above are presented some preferred embodiments of the invention. However, the invention is not intended to be limited to these solutions shown as examples, but the intention is to be able to apply the invention widely within the limits defined by the claims.

Thus, when desired, a part of the drying section can of course be provided with other previously known air exhaust and supply systems in addition to the apparatus solutions according to the invention. When desired, a portion of the exhaust air can be directly discharged from the drying section, without directing the air to the heat recovery tower. In addition, substitute air can be supplied to the drying section also via other routes than through the heat recovery tower.

When desired, a part of the exhaust air from devices operating by negative pressure can be directed directly out from the drying section, outside the solution according to the invention, or circulated back to the drying section in a previously known manner.

The invention is particularly well applicable in a drying section provided with a single wire run, but it is also conceivable to use it in other corresponding drying sections. The invention is well applicable in drying sections where a part of the conventional drying cylinders or all conventional drying cylinders are replaced by drying cylinders provided with top blow hoods or by suction rolls.

What is claimed is:

1. A method in a papermaking machine or the like for exhausting air and supplying air to a drying section covered with a hood, wherein the drying section has at least a plurality of drying cylinders wrapped by a web, the dryer section having a plurality of negative pressure devices operated by negative pressure which draw air from the vicinity of the web, and a plurality of first devices operated by positive pressure which first devices are runnability components which create negative pressure at desired points of the web, and a plurality of second devices operated by positive pressure which do not create negative pressure, the method comprising the steps of:

drawing air by a first blower from the negative pressure devices which draw air from the vicinity of the web and exhausting all said air directly to a first heat recovery tower drawing substitute air by a second blower from the first heat recovery tower and discharging said air to the plurality of first devices operated by positive pressure, thereby creating a negative pressure at desired points of the web, the negative pressure attaching the web to a wire and stabilising its run;

supplying by a third blower substitute air from a second separate heat recovery tower to the plurality of second devices operated by positive pressure; and drawing by a fourth blower between 20 percent and 60 percent of all air exhausted from an air space formed by the hood, said air being drawn directly from the hood, and not from the vicinity of the web, and exhausting said drawn air directly from the air space to the second separate heat recovery tower.

2. The method of claim 1, wherein the second blower supplies a second portion of the exhaust air from the air space of the hood as circulating air, back into the hood, said second portion being supplied to the plurality of first devices operated by positive pressure along with the substitute air from the first heat recovery tower to the plurality of first devices.

3. The method of claim 1, wherein the amount of all air exhausted from the air space is controlled by controlling the volume of exhaust air from the air space via the second heat recovery tower.

4. The method of claim 1, wherein the air supply into the hood is controlled by controlling the volume of substitute air supplied via the second heat recovery tower.

5. The method of claim 1, wherein a portion of air, which is a fraction of the exhaust air substantially smaller than the fraction of air exhausted by the fourth blower, is additionally exhausted from the air space by the first blower via the first heat recovery tower, whereby the portion of air is mixed with the exhaust air drawn from the vicinity of the web by the first blower.

6. The method of claim 1, wherein humid air is supplied from the negative pressure devices in the drying section to one to two separate first heat recovery towers in order to recover the heat from said humid air.

7. The method of claim 1, wherein the substitute air drawn by the second blower is about 20 to 80% of the air required by the runnability components.

8. The method of claim 1, wherein 20 to 50% of the substitute air of the drying section is brought via the single second heat recovery tower.

9. The method of claim 1 wherein the hood has a ceiling and the fourth blower exhausts air from the ceiling of the hood to the second separate heat recovery tower.

10. An apparatus in a papermaking machine for supplying substitute air to and exhausting air from a dryer section covered with a hood defining an air space, the apparatus comprising:

at least one drying group contained within the hood, said at least one drying group having a plurality of drying cylinders, a web traversing said plurality of drying cylinders and, a plurality of negative pressures devices operated by negative pressure which draw air from the vicinity of the web, and a plurality of first devices operated by positive pressure which first devices are runnability components which create negative pressure at the web, and a plurality of second devices operated by positive pressure which do not create negative pressure;

at least one first heat recovery tower having a first blower connected to the plurality of negative pressure devices and connected directly to the first heat recovery tower to exhaust air from the plurality of negative pressure devices;

wherein the at least one first heat recovery tower has a second blower connected to the plurality of first devices, the second blower connected to draw a first substitute airflow from the at least one first heat recovery tower to operate the plurality of first devices;

at least one second heat recovery tower having a third blower connected to supply air into the hood to the plurality of second devices, and the third blower connected to the second heat recovery tower to draw a second substitute airflow from the at least one second heat recovery tower;

wherein the at least one second heat recovery tower has a fourth blower connected to the hood, the fourth blower connecting the at least one second heat recovery tower so as to exhaust air from the hood, wherein the first heat recovery tower is connected only to the first and second blowers, and no other blowers;

wherein the second heat recovery tower is connected only to the third and fourth blower, and to no other blowers.

11. The apparatus of claim 10 wherein the second blower draws air from the first heat recovery tower and from the air space of the hood to operate the plurality of first devices.

12. The apparatus of claim 10 further comprising a control means for controlling the air volume supplied to and from the hood, the control means adjusting the flow of air into and out of the first heat recovery tower so that, after adjustment, the flow into and out of the first heat recovery tower is held constant, while the airflow into and out of the second heat recovery tower is varied as necessary.

13. The apparatus of claim 10 wherein the apparatus comprises one to five separate first heat recovery towers arranged in the drying section.

14. The apparatus of claim 10 wherein the drying section is provided with a single wire run, and the negative pressure devices comprise at least one device selected from the group consisting of suction rolls and suction boxes;

wherein the first devices are blow boxes arranged in pockets between the drying cylinders; and wherein the second devices are devices supplying heating air and/or ventilation air.

15. The apparatus of claim 10 wherein the apparatus comprises at least one first and one second heat recovery tower, and wherein the heat recovery towers comprise devices for preheating substitute air to be supplied into the hood, and for heating water to be used in manufactory processes.

16. An apparatus in a papermaking machine for supplying substitute air to and exhausting air from a dryer section covered with a hood defining an air space, and a ceiling which is uppermost within the hood, the apparatus comprising:

at least one drying group contained within the hood, said at least one drying group having a plurality of drying cylinders, a web traversing said plurality of drying cylinders and a plurality of negative pressure devices operated by negative pressure which draw air from the vicinity of the web, and a plurality of first devices operated by positive pressure which first devices are runnability components which create negative pressure at the web, and a plurality of second devices operated by positive pressure which do not create negative pressure;

at least one first heat recovery tower having a first blower connected to the negative pressure devices and connected directly to the first heat recovery tower to exhaust air from the negative pressure devices;

wherein the at least one first heat recovery tower has a second blower connected to the first devices, the second blower connected to draw a first substitute airflow from the at least one first heat recovery tower and to draw no air from the negative pressure devices, the second blower connected to operate the first devices;

at least one second heat recovery tower having a third blower connected to supply air within the hood to the plurality of second devices, and the third blower is connected to the second heat recovery tower to draw a second substitute airflow from the at least one second heat recovery tower;

wherein the at least one second heat recovery tower has a fourth blower connected to exhaust air from the ceiling of the hood, through the at least one second heat recovery tower; and a control means for controlling the air volume supplied to and from the hood, the control means adjusting the flow of air into and out of the first heat recovery tower so that, after adjustment, the flow into and out of the first heat recovery tower is held constant, while the airflow into and out of the second heat recovery tower is varied as necessary.

* * * * *

UNITED STATES PATENT AND TRADEMARK OFFICE
CERTIFICATE OF CORRECTION

PATENT NO. : 6,732,453 B2
DATED : May 11, 2004
INVENTOR(S) : Petri Norri

It is certified that error appears in the above-identified patent and that said Letters Patent is hereby corrected as shown below:

Delete drawing sheets 1 and 2, consisting Figs. 1 and 2 and substitute therefore the drawing sheets consisting of Figs. 1 and 2 as shown on the attached pages.

Signed and Sealed this

Twenty-seventh Day of September, 2005

JON W. DUDAS
*Director of the United States Patent and Trademark Office*